United States Patent
Barelli et al.

(10) Patent No.: US 12,027,041 B1
(45) Date of Patent: Jul. 2, 2024

(54) SYSTEMS AND METHODS FOR DETECTING STOP SIGN VEHICLE COMPLIANCE

(71) Applicants: Kamran Barelli, Great Neck, NY (US); Kiyan Barelli, Great Neck, NY (US)

(72) Inventors: Kamran Barelli, Great Neck, NY (US); Kiyan Barelli, Great Neck, NY (US)

(*) Notice: Subject to any disclaimer, the term of this patent is extended or adjusted under 35 U.S.C. 154(b) by 0 days.

(21) Appl. No.: 18/609,092

(22) Filed: Mar. 19, 2024

Related U.S. Application Data

(60) Provisional application No. 63/453,121, filed on Mar. 19, 2023.

(51) Int. Cl.
*G06V 20/58* (2022.01)
*G08G 1/01* (2006.01)
(Continued)

(52) U.S. Cl.
CPC ......... *G08G 1/0133* (2013.01); *G08G 1/0116* (2013.01); *G08G 1/0175* (2013.01);
(Continued)

(58) Field of Classification Search
CPC .... G08G 1/054; G08G 1/0133; G08G 1/0116; G08G 1/0137; G08G 1/0141;
(Continued)

(56) References Cited

U.S. PATENT DOCUMENTS 6,950,789 B2 * 9/2005 Laird ............... G08G 1/08 703/8
7,986,339 B2 * 7/2011 Higgins ............ G08G 1/054 348/149

(Continued)

FOREIGN PATENT DOCUMENTS

CN 107144285 B * 6/2020 .......... G01C 21/165
DE 112007001076 T5 * 4/2009 ............ G01C 21/30
(Continued)

OTHER PUBLICATIONS

Shokry, Sherif, and Shinji Tanaka. "Evaluating the operational performance of signalized intersections involving U-turns in Aswan City, Egypt." Journal of the Eastern Asia Society for Transportation Studies 11 (2015): 1754-1773. (Year: 2015).*

(Continued)

*Primary Examiner* — Cuong H Nguyen
(74) *Attorney, Agent, or Firm* — Boris Leschinsky

(57) ABSTRACT

A system and method for detecting and qualifying stop sign compliance by a moving vehicle includes a computing device configured to process a video recording from a camera observing the stop sign zone. The computing device may be configured to identify a start frame and an end frame when the vehicle is respectively at a virtual start line of a stop sign zone and the end line thereof. The number of frames inbetween may be used to calculate the time of the vehicle traveling through the stop sign zone. The speed of the vehicle is determined using a scale factor from any recognized object with known dimensions such as the stop sign itself, the stop line, or the license plate. The position of the start line and stop line may be adjustable via user interface based on local conditions and preferences.

20 Claims, 7 Drawing Sheets

(51) Int. Cl.
*G08G 1/017* (2006.01)
*G08G 1/054* (2006.01)
*G06V 20/56* (2022.01)

(52) U.S. Cl.
CPC .... *G06T 2207/30256* (2013.01); *G06V 20/58* (2022.01); *G06V 20/588* (2022.01); *G08G 1/054* (2013.01)

(58) Field of Classification Search
CPC .... G08G 1/0145; G08G 1/0175; G01S 19/42; H04N 7/181; H04N 7/183; H04N 7/185; G06V 20/58; G06V 20/588; G06T 2207/30256
USPC .......................................... 701/117; 340/937
See application file for complete search history.

(56) References Cited

U.S. PATENT DOCUMENTS

| | | | | |
|---|---|---|---|---|
| 9,152,865 | B2* | 10/2015 | Swaminathan | G08G 1/0116 |
| 10,018,703 | B2* | 7/2018 | Bernal | G06T 7/223 |
| 10,471,955 | B2* | 11/2019 | Kouri | G08G 1/09623 |
| 11,745,733 | B2* | 9/2023 | Tsuji | B60W 60/0017 |
| | | | | 701/23 |
| 11,767,012 | B2* | 9/2023 | Song | G02B 7/025 |
| | | | | 701/301 |
| 11,900,657 | B2* | 2/2024 | Bravi | G08G 1/052 |
| 2014/0362222 | A1* | 12/2014 | Swaminathan | G08G 1/0116 |
| | | | | 348/149 |
| 2021/0341303 | A1* | 11/2021 | Rappel-Kroyzer | |
| | | | | G06F 16/24556 |
| 2023/0118619 | A1* | 4/2023 | Horihata | G06T 7/70 |
| | | | | 340/937 |
| 2023/0182732 | A1* | 6/2023 | Horita | G01S 17/931 |
| | | | | 701/93 |
| 2023/0311935 | A1* | 10/2023 | Yoshida | B60W 50/0205 |
| | | | | 701/23 |

FOREIGN PATENT DOCUMENTS

| | | | | |
|---|---|---|---|---|
| DE | 112021003339 T5 | * | 4/2023 | ............... G06T 7/20 |
| JP | 7452650 B2 | * | 3/2024 | ............... G06T 7/20 |
| KR | 20170126909 A | * | 11/2017 | ............. G01C 21/32 |
| WO | WO-2021261227 A1 | * | 12/2021 | ............... G06T 7/20 |

OTHER PUBLICATIONS

Y. Saito et al., "Effectiveness of a Driver Assistance System With Deceleration Control and Brake Hold Functions in Stop Sign Intersection Scenarios," in IEEE Transactions on Intelligent Transportation Systems, vol. 23, No. 7, pp. 8747-8758, Jul. 2022, doi: 10.1109/TITS.2021.3085847. (Year: 2022).*

Qiu, Hang, et al. "Kestrel: Video analytics for augmented multi-camera vehicle tracking." 2018 IEEE/ACM Third International Conference on Internet-of-Things Design and Implementation (IoTDI). IEEE, 2018. (Year: 2018).*

Polders, Evelien, et al. "Drivers' behavioral responses to combined speed and red light cameras." Accident Analysis & Prevention 81 (2015): 153-166. (Year: 2015).*

* cited by examiner

SYSTEMS AND METHODS FOR DETECTING STOP SIGN VEHICLE COMPLIANCE

CROSS-REFERENCE DATA

This application claims a priority date benefit from a U.S. Provisional patent Application No. 63/453,121 filed on 19 Mar. 2023 with the same title and by the same inventors, the content of which is incorporated herein in its entirety by reference.

BACKGROUND

Without limiting the scope of the invention, its background is described in connection with automated systems and methods to detect traffic violations. More particularly, the invention describes a system and method for operating thereof configured to detect drivers that violate the stop sign traffic regulations.

Drivers who violate the stop sign pose a significant danger to themselves and others on the road. When a driver ignores a stop sign, they are disregarding a crucial traffic control device designed to ensure safe driving. This behavior can result in accidents, injuries, and even fatalities. Additionally, ignoring a stop sign can lead to a ticket or fine, which can result in financial consequences for the driver. The potential for legal ramifications aside, failing to stop at a stop sign can result in irreversible and tragic consequences. Therefore, it is essential for all drivers to respect and obey traffic signals, including stop signs, to ensure the safety of themselves and others on the road.

Children are particularly vulnerable to the dangers of drivers violating traffic regulations. Children may be less aware of their surroundings, less experienced with traffic, and less visible than adult pedestrians or drivers. When drivers ignore traffic regulations such as speed limits, stop signs, or crosswalks, they increase the risk of accidents involving children. These accidents can result in severe injuries or fatalities, as children are more likely to sustain serious injuries from vehicle collisions. Additionally, drivers who engage in distracted driving, such as using a cell phone, may be less likely to notice children crossing the street or playing near the road. Therefore, it is crucial for drivers to pay close attention to their surroundings, obey traffic regulations, and remain alert for the presence of children in areas where they are likely to be present, such as school zones, residential areas, or parks. By taking these precautions, drivers can help reduce the risk of accidents involving children and ensure the safety of the youngest and most vulnerable members of our communities.

Police cannot be present at every intersection to observe proper driver behavior. This is due to several reasons. Firstly, there are simply too many intersections and too few police officers to cover them all. It would be impractical and prohibitively expensive to assign police officers to monitor every intersection continuously. Secondly, police officers have other responsibilities, such as responding to emergency calls, conducting investigations, and patrolling other areas of the city. They cannot devote all their time to monitoring intersections. Thirdly, some intersections may be located in areas that are difficult or dangerous for police officers to access, such as busy highways or remote rural roads.

Moreover, relying solely on police officers to enforce traffic regulations is not an efficient or sustainable solution. Technology can play a significant role in monitoring driver behavior, such as cameras, radar, and other sensors. Automated systems that can identify and ticket drivers who violate traffic regulations are generally known. They have the advantage of freeing up police officers to focus on other responsibilities.

Automated systems to monitor traffic and find drivers who violate traffic regulations of the prior art have several disadvantages. One disadvantage is that these systems may not always be accurate. For example, a camera-based system may mistake one car for another, resulting in an innocent driver receiving a ticket. Additionally, automated systems may not be able to account for certain circumstances, such as emergency vehicles, roads covered with snow, or road construction, which could result in innocent drivers receiving tickets or in violators that do not receive tickets.

Another disadvantage of automated systems is the potential for technical malfunctions. If a system experiences a malfunction or a software glitch, it could result in incorrect data, false tickets, or a system failure altogether. Moreover, these systems may not be effective in detecting more subtle violations, such as rolling through a stop sign. Overly aggressive ticket issuance is both unnecessary and annoying for the local population, while overly passive "permissive" behavior of such a system does not promote proper safety for pedestrians, and especially for children.

The need exists, therefore, for a more flexible automated system and methods for identifying traffic violators while providing flexibility for local law enforcement as to the degree of "strictness" for issuing traffic tickets to local drivers.

SUMMARY

Accordingly, it is an object of the present invention to overcome these and other drawbacks of the prior art by providing novel systems and methods for detecting stop sign compliance by a moving vehicle that overcome the limitations of the prior art.

It is another object of the present invention to provide novel systems and methods for detecting and qualifying stop sign compliance by a moving vehicle that are configurable based on local conditions and laws.

It is a further object of the present invention to provide novel systems and methods for detecting and qualifying stop sign compliance by a moving vehicle that can provide a report with various degrees of compliance specified by various predetermined criteria.

The system of the present invention includes at least one video camera positioned to have a field of view of a portion of the road of interest and an adjacent stop sign. The system further includes a computing device operably connected to the video camera and configured to receive a video recording therefrom. The computing device may be configured to process the video recording to detect and qualify the stop sign compliance of at least one, several, or each passing moving vehicle by performing the following steps:

a. automatically identify a start frame in which the vehicle is at or first crossed a start line indicating beginning of a stop sign zone on the road, wherein the position of the start line is adjustable via user interface based on local conditions and preferences, b. automatically identify an end frame in which the vehicle is at or first crossed an end line indicating an end of the stop sign zone of the road, wherein the position of the end line is adjustable via user interface based on local conditions and preferences, c. calculate a number of frames starting with the start frame and ending with the end frame, d. determine the elapsed time between the start frame and the end frame using the predetermined video recording rate of frames per second, e. qualify the vehicle compliance with the stop sign by a first and/or a second predetermined criterion.

Importantly, at least the position of the start line and the end line, as well as, in some embodiments, one or more predefined thresholds and criteria may be adjusted using the computing device user interface to comply with local conditions and preferences, including local rules and regulations.

In some embodiments, only the first criterion may be used, while in other embodiments, applying the first criterion may be followed by applying the second criterion.

A report may be generated for the vehicle which is found to not comply with the stop sign regulations, which may be followed by issuing a ticket or applying another penalty to the person listed on the vehicle's registration data.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION OF PREFERRED EMBODIMENTS OF THE INVENTION

Figure 1:
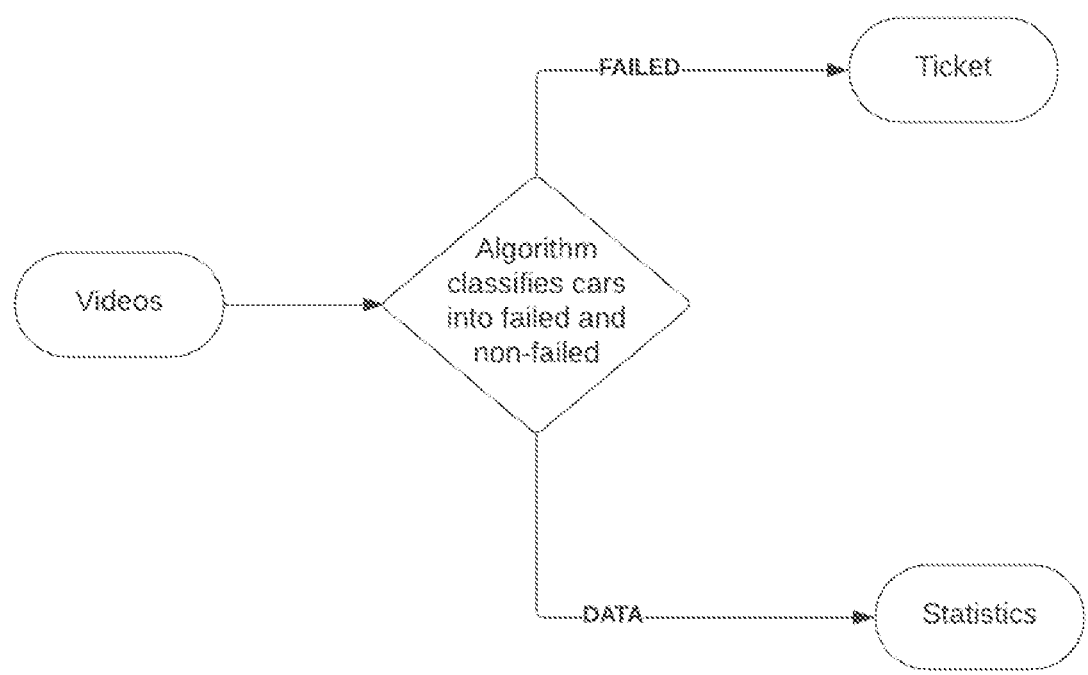
FIG. 1 is a general diagram of the system of the present invention.

The following description sets forth various examples along with specific details to provide a thorough understanding of claimed subject matter. It will be understood by those skilled in the art, however, that claimed subject matter may be practiced without one or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The term "vehicle" means any means of transportation legally allowed to travel on a road, such as cars, trucks, buses, motorcycles, bicycles, etc. as the invention is not limited in this regard.

FIG. 1 shows a general flow diagram of the system of the present invention. It is based on one or more video cameras located and positioned to provide a full field of view of the intersection or a portion of interest of the road including a stop sign and, when available, the stop line. A properly positioned video camera may be configured to continuously transmit the video feed or the video recording to a server or another computing device operably connected thereto. In other embodiments, the video camera may be configured to allow for a periodic scheduled or on demand transmission or a download of a video recording therefrom. The video camera may be connected to the computing device via a cable or wirelessly, as the present invention is not limited in this regard.

A secure server or a computing device, in turn, may be configured to include one or more processors, one or more connected computers, etc. as can be appreciated by a person skilled in the art. The computing device may also be configured to run a special software which in turn may be adapted to (i) configure and set up the video surveillance system of the present invention and (ii) analyze the video recording from the video camera in order to detect traffic violations.

The computing device may use machine learning to recognize various moving objects as vehicles. In particular, a convolutional neural network learning method may be used to reliably identify various moving objects through the field of view as vehicles or not. Other advanced machine learning methods may also be used for this purpose, as the invention is not limited in this regard.

Once the computing device processes the video recordings, it may generate a report. One, several, or all vehicles that move through the road portion of interest, may be classified as failed or non-failed, for example as compliant or non-compliant, depending on the criteria used for such determination. As a result, compliant vehicles may be counted for statistical data purposes, such as the density of traffic, etc. non-compliant vehicles may also be counted for statistical purposes, as well as reported to law enforcement for issuing traffic violation tickets or other penalties. Violation statistics and/or a comprehensive traffic flow report may also be complied from this data. The video recording or corresponding photos may be attached to the report to illustrate the violation.

Figure 2:
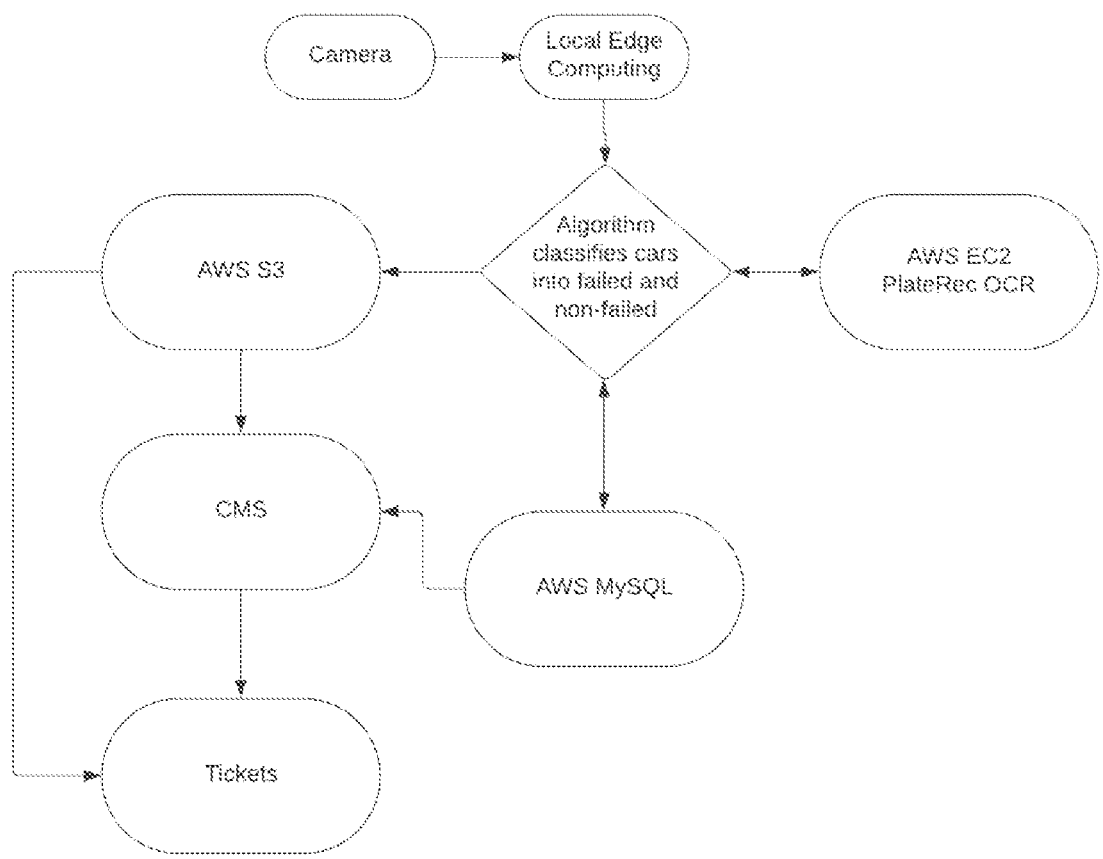
FIG. 2 is the same with greater details of the components of the system and interaction between thereof.
Figure 3:
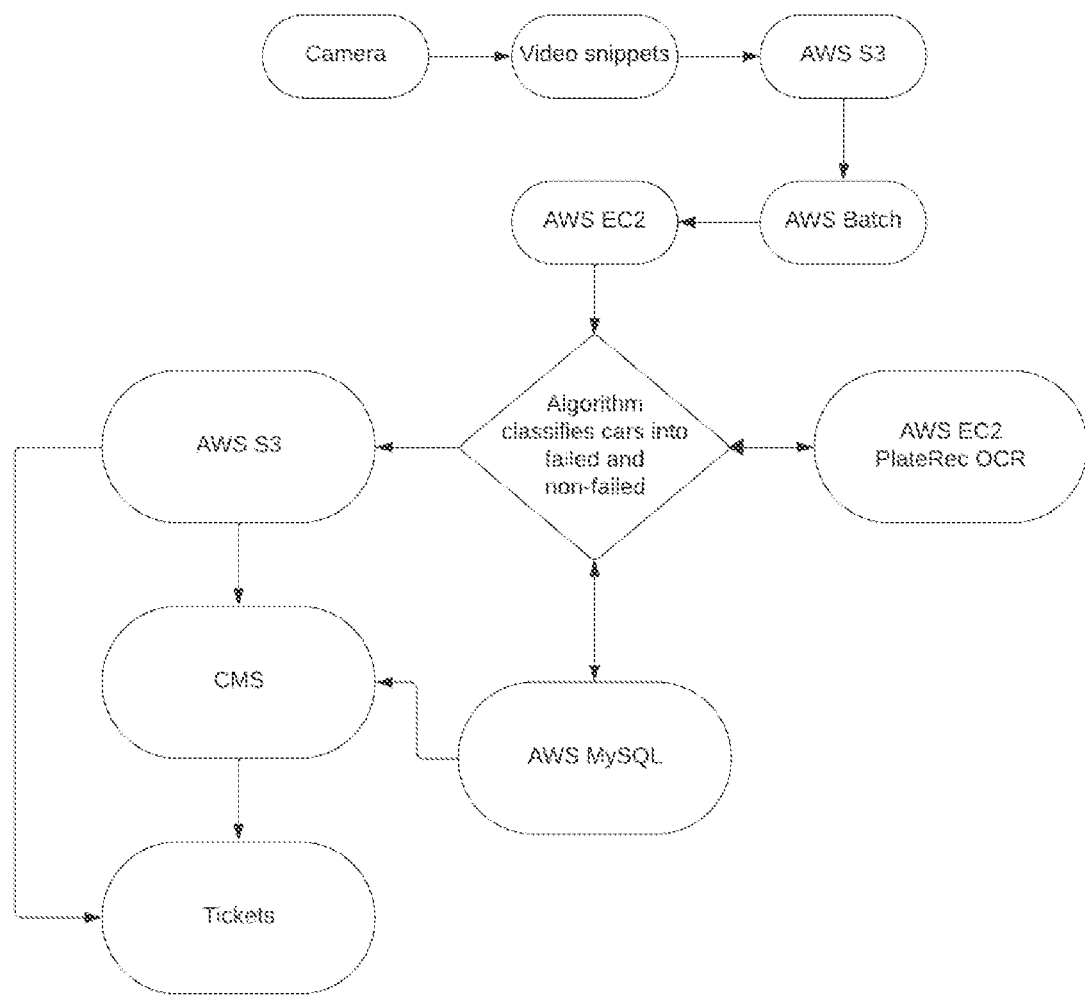
FIG. 3 is the same with further yet details of the components of the system and interaction between thereof.

FIGS. 2 and 3 show greater details of the system configuration and interaction between various components thereof, according to various embodiments of the invention.

The following is a list of abbreviations used to denote specific components of the system:
  AWS: Amazon Web Services
  S3: Amazon cloud object storage
  EC2: Amazon Server Instance
  PlateRec OCR: Plate number—Optical character recognition to facilitate machine reading of the vehicle's license plate
  CMS: Content Management System, Dashboard where the date is searched and processed
  AWS MySQL: Amazon Database
  AWS Batch: AWS Batch is a fully managed batch computing service that plans, schedules, and runs the containerized batch ML, simulation As can be understood by those skilled in the art, these components represent an exemplary configuration of the system. Other server services and providers of cloud computing may be used, as the invention is not limited in this regard.

The main algorithm described below is configured to detect failed and non-failed vehicles when it comes to properly proceeding through a stop sign. One of the key novel features of the invention is a greater depth of differentiation between various driver behaviors. Traditionally, the driver and the car are characterized as either failed or non-failed based on a single notion of whether the driver stopped completely or not at the stop sign. The present invention expands this simplistic characterization and allows for more classification modes, which in turn is instrumental to allow local authorities to interpret the traffic violation data in a more sophisticated manner.

In particular, the traffic data processed by the present invention allows the vehicle and the driver to be characterized according to a first criterion as follows:
  compliant with strict regulations,
  compliant with at least slow-down regulations, or
  non-compliant with any regulations.

For vehicles compliant with strict regulations or slow-down regulations, the method provides for a second criterion based on whether the vehicle came to a complete stop or just slowed down at the stop line. The vehicle may be then qualified as:
  compliant with police-strict regulations (and, by default, with strict regulations) if the vehicle came to a complete stop for at least the predetermined stop time threshold and at or before the stop line, or
  compliant with strict regulations but non-compliant with police-strict regulations if the vehicle came to a complete stop for at least the predetermined stop time threshold but it stopped beyond the actual stop line on the road.

Figure 4:
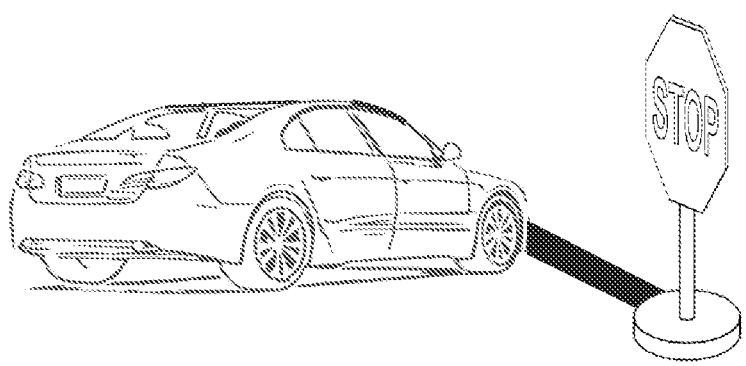
FIG. 4 is an illustration of a vehicle at a complete stop which is compliant with a police-strict criteria.

FIG. 4 shows an example of a vehicle at a complete stop by the stop line which is compliant with a police-strict criterion.

Figure 5:
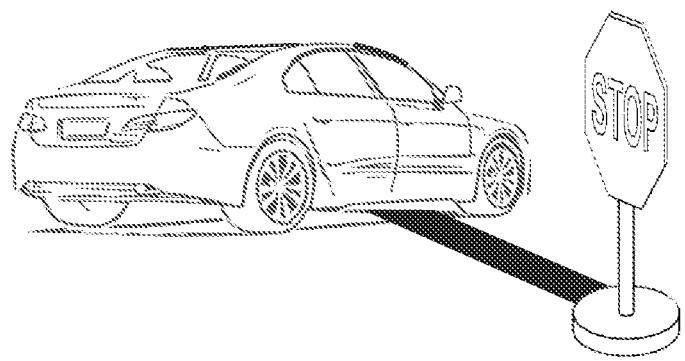
FIG. 5 is an illustration of a vehicle making a complete stop after the stop line which is compliant with a strict criteria.

FIG. 5 shows an illustration of a vehicle making a complete stop after the stop line which may be compliant with a strict criterion, but not compliant with a police-strict criterion. In some cases, the local rules define 3 feet as the allowable distance beyond the stop line where the vehicle can still come to a complete stop and be within the allowable limits. Other jurisdictions may have other limits. The present invention allows to customize the system of the invention to accommodate all local rules, regulations, and preferences as explained in more detail below.

Figure 6:
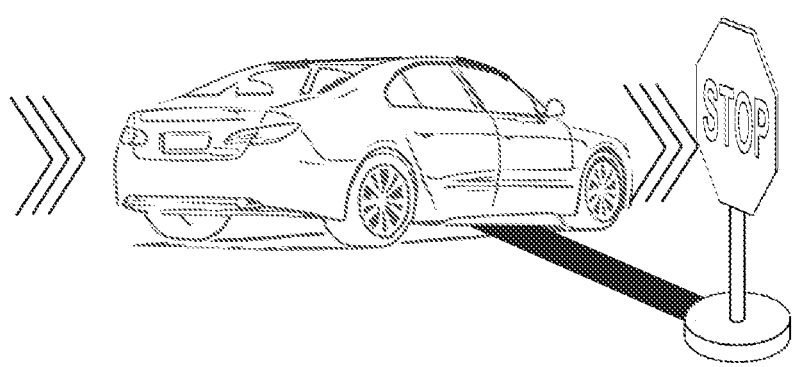
FIG. 6 is an illustration of a vehicle which has slowed down but did not make a complete stop which is compliant with a slow-down criteria.

FIG. 6 shows an illustration of a vehicle which slowed down but did not make a complete stop at the stop line, which may be compliant with a slow-down criterion depending on the speed but is not compliant with strict or police-strict criteria. An example of a numerical limit for the slow-down speed is 3 mph which is used by some local jurisdictions as an allowable speed limit. The present invention allows for any such limit to be entered by the local authorities which is then taken into account when classifying the vehicles as failed or non-failed the stop sign regulations.

Figure 7:
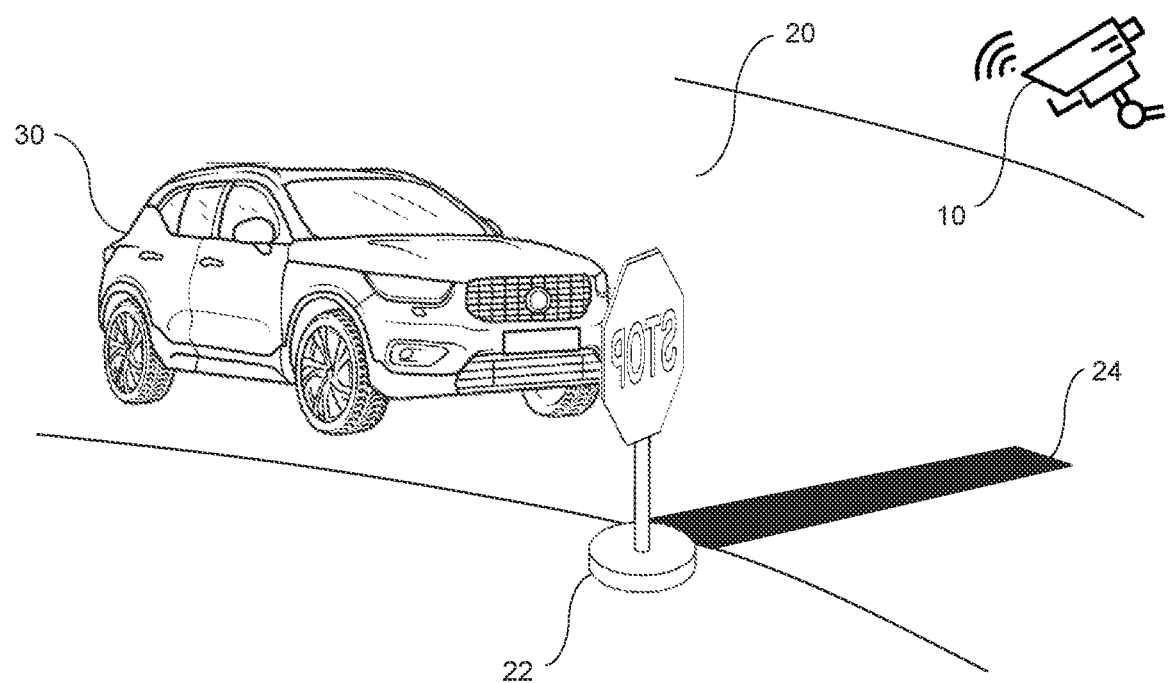
FIG. 7 is a general view of the components of the system of the present invention.

Setting up and processing of the video recording is now described with reference to FIG. 7. A video camera 10 may be positioned to have a field of view of the portion of the road 20 that includes a stop sign 22 and, if available, a stop line 24. In embodiments, the position of the camera 10 may be selected to be a minimum 15 ft away from the stop sign 22 and up to 100 ft so as to completely cover the area before and after the sign with sufficiently high resolution. The camera can be placed to record the front of the vehicle 30 or the back of the vehicle 30. The height of the camera may be selected to be between 5 ft and 20 ft from the ground. A second or more cameras may also be used to provide observation of the stop sign 22 from different viewpoints. All cameras may be located remotely from the computing device and may be operably connected to provide video recording to the computing device via a wired or wireless connection. The invention also allows the use of existing security cameras that may be already available to provide the view of the stop sign zone of interest.

Figure 8:
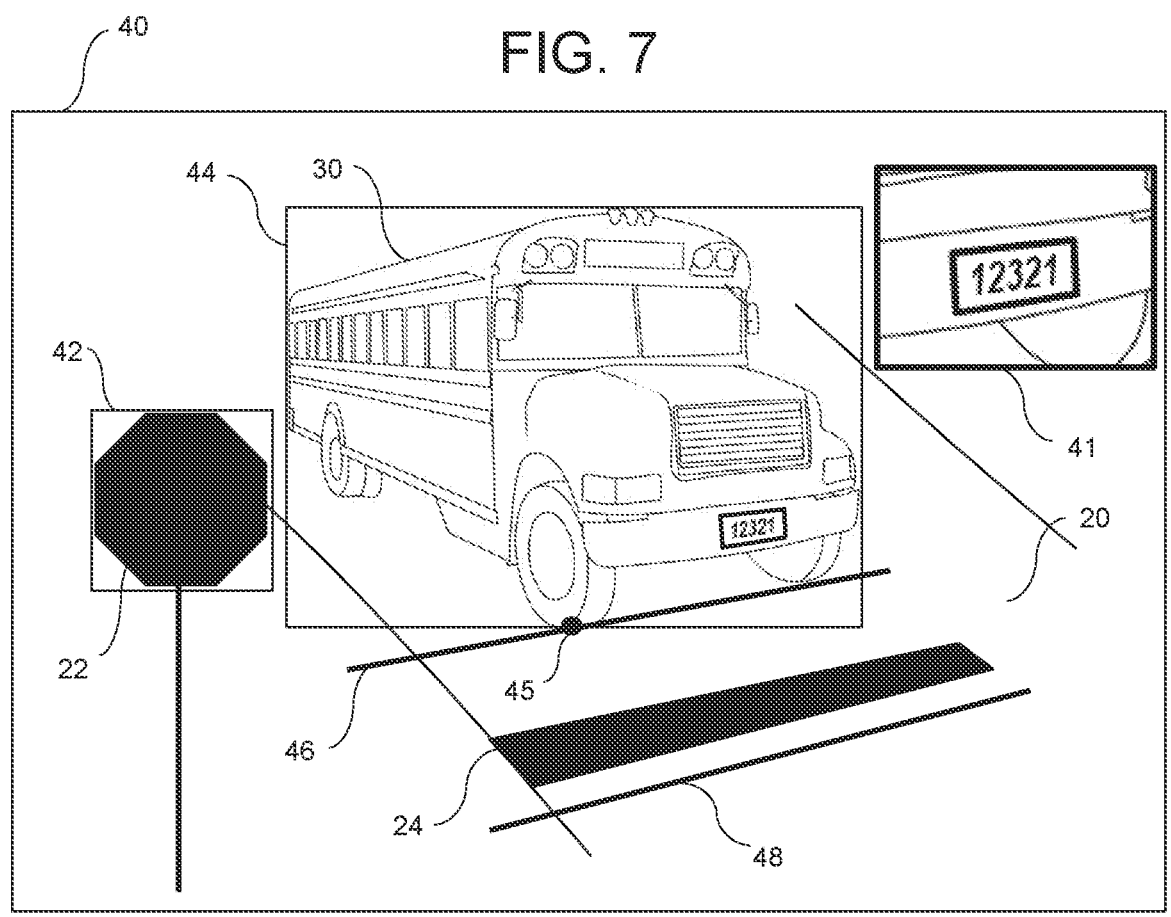
FIG. 8 is an illustration of a start frame as detected by the computing device analyzing the video recording from the video camera with the vehicle approaching the stop line.
Figure 9:
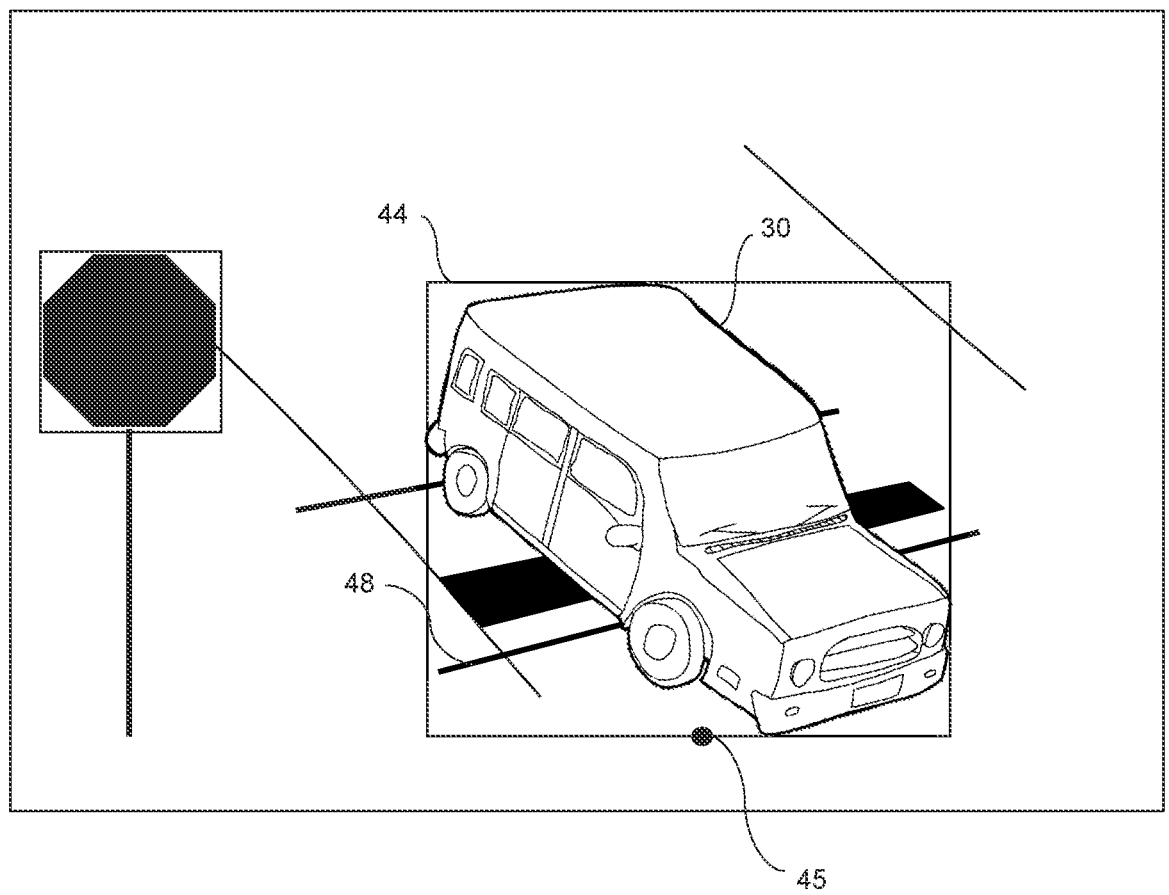
FIG. 9 is an illustration of the frame with the vehicle leaving the stop sign zone.

An exemplary screen view of the video recording from the video camera 10 is illustrated in FIG. 8. Physical distances may be automatically measured by using a known-size recognized object that is present in the field of view. One example of such recognized subject is a stop sign 22 itself. All stop signs have a well-recognized octagonal shape, which can be automatically identified in the field of view of the video camera 10. Since the video camera 10 is permanently mounted in the same location, the stop sign position is not expected to change in its field of view from one moving vehicle to the next. Stop sign size is regulated and is the same throughout the US. The width or the height of the stop sign may be assumed to be 34 inches, as dictated by US-wide regulations. Since the view of the stop sign may be from an oblique angle, the height of the stop sign may be used as a known size. Once the stop sign is identified, a step of determining a scale factor using the known size of the stop sign and the visible height thereof in the field of view may be performed. The scale factor may then be applied to other objects or distances between objects as required to estimate their actual physical size or distance. The scale factor may be expressed in a number of pixels per a physical length measure, such as inches or feet.

The stop line may also be used as a recognized object. In the US, the width of the stop line is typically 12 inches.

Another example of a known-size recognized object is the license plate of the vehicle, which is also the same in all US states, typically 6 inches high by 12 inches wide. As with the stop sign, the height of the license plate may be used to determine a scale factor which may be a ratio of the known height of the license plate to the visible height thereof in the field of view. One advantage of using the license plate is that it travels along with the moving vehicle so the scale factor may change slightly as the vehicle is progressing through the stop sign zone. Using the license plate allows an accurate estimation of the physical distances associated with the moving vehicle, which using the stop sign as a basis for the scale factor is more useful in estimating the physical size and distances of the stationary objects such as position of the road and the stop line.

Measuring physical distances may be useful in estimating the speed of the vehicle. In embodiments, the distance that the vehicle travels may be estimated from the movement of one or more points on the vehicle frame along the road using the distance measurement technique based on the scale factor described above. The time may be determined by the known rate of frames in the video recording. Knowing the time and distance allows calculation of the vehicle speed.

The field of view 40 of the video camera may be selected to cover the entire stop sign zone of the road 20, starting at some point before the stop line 24 and extending some distance after the stop line 24. An optional perspective correction transformation may be applied based on the calibration and scale factors described above. In this case, correcting the oblique view to a standard format may further simplify distance and speed calculations.

Two virtual straight lines are then placed on the field of view to denote the entire stretch of the stop sign zone: a start line 46 and an end line 48 as seen in FIG. 8. Note that the end line 48 may be placed at the actual stop line 24 or beyond the stop line 24 by a selected distance, for example, 3 ft. a stop sign zone may be defined as extending from the start line 46 to the end line 48.

Other suitable parameters may also be set during the initial setup, such as selection of whether the car is expected to drive toward or away from the camera, whether the left or the right side of the car is visible, local time and date, selection of the specific criteria to classify the vehicle as failed or non-failed, etc. As mentioned above, the system may be configured to determine the distance between the two lines in FIG. 8 using the size of the stop sign 22 which is present in the same view. The lines are saved by using their endpoints as coordinates of pixel values.

As an optional addition to the system of the invention, a license plate bounding box 41 may be enlarged and displayed separately. An optical character recognition or another machine reading method may be used to detect and read the license plate of the vehicle 30. The system of the invention may be operably connected to one or more databases containing vehicle registration data. An inquiry for the vehicle owner information may be automatically generated for failed vehicles so as to facilitate contacting the registered owner of the vehicle for the purposes of sending a ticket or another penalty. The video recording or a suitable part of the photo recording may be also provided to illustrate the violation.

Once the initial setup is complete, the system of the invention may be operated for its intended purpose. This operation may proceed regardless of whether the same elements of the road are well-seen in the field of view 40 or not. This is one of the advantages of the present invention, when, for example, a part or the entire stop sign zone is covered with snow, as the green lines on the stop sign view are still present in the field of view 40.

Detection of the vehicle speed and whether the vehicle has stopped or not may be based on a known frame frequency rate of the video recording, for example, 30 frames-per-second (or FPS), 60 frames-per-second, or another fixed or variable known frequency as may be measured in FPS. The system of the invention may be configured to count the number of frames between certain events as described below and therefore be capable of computing the time which elapsed between these events.

The system may be configured to assign a vehicle bounding box 44 to each vehicle 30 that appears in the field of view 40 of the stop sign zone. One or more characteristic points may be selected on the vehicle bounding box, such as a center point of the vehicle bounding box, a middle point of the lower border 45 of the vehicle bounding box, etc. A stop sign bounding box 42 may also be placed that surrounds the stop sign 22 in the field of view 40.

As the vehicle moves through the stop sign zone between the start line 46 and the end line 48, the video recording may contain a number of frames recoding this process. In embodiments, the first frame of the video recording in which the middle point 45 of the lower border of the vehicle bounding box 44 is first detected as located on the start line 46 or within the stop sign zone may be designated as the start frame.

Similarly, the first frame of the video recording in which the middle point 45 of the lower border of the vehicle bounding box 44 is first detected as located on the end line 48 or beyond the stop sign zone entirely may be designated as the end frame.

The first criterion for determining compliance with the traffic rules is the elapsed time that the vehicle 30 spends between the start line and the end line of the stop sign zone. This is determined by counting the number of frames starting with the start frame and ending with the end frame. The elapsed time allows characterizing a vehicle in one of three categories:
  a. compliant with strict regulations if the elapsed time is at or exceeds a strict elapsed time threshold,
  b. compliant with at least slow-down regulations, if the elapsed time is at or exceeds a predetermined slow-down elapsed time threshold but is less than the strict elapsed time threshold;
  c. non-compliant with any regulations if the elapsed time is less than the slow-down elapsed time threshold.

Thereafter, the system may apply a second criterion to the vehicles that are at least in the first two categories, namely, to determine if the vehicle came to a complete stop for a predetermined period of time. To do so, a threshold of 0.75 sec or another suitable time threshold may be selected, which defines the number of frames where the vehicle has to be seen in the same place. In one example, for 0.75 seconds and 60 frames per second, there should be at least 0.75×60-45 frames in which the position of the vehicle should be the same in all successive frames, within the defined error margin, such as plus or minus 5 inches. The vehicles may then be classified according to the following in one of three groups:
  a. compliant with police-strict regulations and with strict regulations if the vehicle came to the complete stop for at least the predetermined stop time threshold and the vehicle is located within the stop sign zone before or at the actual stop sign or stop line on the road,
  b. compliant with strict regulations but non-compliant with police-strict regulations if the vehicle came to the complete stop for at least the predetermined stop time threshold and the vehicle is located within the stop sign zone beyond the actual stop sign or stop line on the road,
  c. non-compliant with either the police-strict regulations or the strict regulations if the vehicle did not come to the complete stop for at least the predetermined stop time threshold.

Overall, the system of the invention allows determination of the following vehicle categories:
  a. Level 1, Police-strict—denotes a police-strict classification: the vehicle must come to a complete stop before the stop line. In this case, the end line 48 must be drawn directly on the stop line 24;

b. Level 2, Strict—the vehicle must come to a complete stop before the stop line 24 or up to X feet after the stop line (X may vary based on each scene where vehicles may need to drive up more to be able to view the road due to obstacles like bushes or trees etc.);

c. Level 3, Slowed down—the vehicle must significantly slow down before the stop line 24 (e.g., a rolling stop) where the vehicle does not necessarily come to a complete stop at all.

Once the determination is made, and if the system is connected to the vehicles database where information about the vehicle may be obtained, and a violation notice may be generated. Alternatively, a report may be generated and transmitted to local police for further action.

Results of the video recording analysis may also be submitted for manual review in case the situation is not clearly defined.

Based on the above description, the method for detecting and qualifying stop sign compliance by a moving vehicle may include the following steps:

a. providing a video camera located with a field of view of a road and an adjacent stop sign, b. operating the video camera to record ongoing traffic with a predetermined rate of frames per second, with the stop sign included in the video recording, c. transmitting the video recording to a computing device operatively connected to the video camera and configured to automatically analyze the video recording therefrom, d. operating the computing device to automatically identify a start frame in which the vehicle is at or first crossed a start line indicating beginning of a stop sign zone on the road, e. operating the computing device to automatically identify an end frame in which the vehicle is at or first crossed an end line indicating an end of the stop sign zone of the road, f. calculating a number of frames starting with the start frame and ending with the end frame, g. determining the elapsed time between the start frame and the end frame using the predetermined video recording rate of frames per second, h. qualifying the vehicle compliance with the stop sign by a first criterion as follows:
compliant with strict regulations, if the elapsed time of step (g) is at or exceeds a predetermined strict elapsed time threshold,
compliant with at least slow-down regulations, if the elapsed time of step (g) is at or exceeds a predetermined slow-down elapsed time threshold but is less than the strict elapsed time threshold, and
non-compliant with any regulations, if the elapsed time of step (g) is less than the slow-down elapsed time threshold, i. for vehicles determined is step (h) to be compliant with strict regulations or slow-down regulations, further qualifying the vehicle by a second criterion of coming to a complete stop for at least a predetermined stop time threshold as follows:
compliant with police-strict regulations and with strict regulations if the vehicle came to the complete stop for at least the predetermined stop time threshold and the vehicle is located within the stop sign zone before or at the actual stop sign or stop line on the road,
compliant with strict regulations but non-compliant with police-strict regulations if the vehicle came to the complete stop for at least the predetermined stop time threshold and the vehicle is located within the stop sign zone beyond the actual stop sign or stop line on the road,
non-compliant with either the police-strict regulations or the strict regulations if the vehicle did not come to the complete stop for at least the predetermined stop time threshold, and j. generating a report with results of the analysis and qualification, wherein the position of the start line and the end line defining the stop sign zone can be adjusted using the computing device based on local conditions and preferences.

Step (d) may also include a step of defining a vehicle bounding box enclosing the vehicle and the step of identifying the start frame in which the vehicle is at or first crossed a start line indicating beginning of a stop sign zone on the road is accomplished using the vehicle bounding box. Step (d) may further include a step of defining a stop sign bounding box enclosing the stop sign and identifying a stop line if available. The stop sign may be identified based on its octagonal shape.

In further embodiments, step (d) may further include a step of defining a start line before the stop sign and an end line after the stop sign to identify the stop sign zone on the video recording from the video camera. Furthermore, identifying the start frame in which the vehicle is at or first crossed a start line may be accomplished using the middle point of the lower border of the vehicle bounding box. The first frame of the video recording in which the middle point of the lower border of the vehicle bounding box is first detected as located on the start line or within the stop sign zone may be designated as the start frame. Similarly, the first frame of the video recording in which the middle point of the lower border of the vehicle bounding box is first detected as located on the end line or beyond the stop sign zone may be designated as the end frame.

The following is a description of the first alternative approach to simplify the vehicle classification as failed or non-failed. It may be based on the average speed of the vehicle as it travels through the stop sign zone. To calculate the average speed, the stop sign zone may be defined to have a fixed and known length. In one example, the length of the stop sign zone may be defined as 7 feet long, including a 3-foot-long part from the start line to the beginning of the stop line, a 1-foot-wide stop line, and a 3-foot-long part after the stop line. The time of the vehicle traveling through this zone may be calculated based on a number of frames starting from the first frame in which the vehicle or the bounding box around the vehicle is first detected to be at or beyond the start line. The first frame in which the bounding box of the vehicle is seen at or beyond the end line is defined as the last frame in this sequence. The total number of frames may then be converted into the time while the vehicle was traversing the stop sign zone using the known frequency of the video recording in frames-per-second. Once the time is determined, the average speed may be calculated as the length of the stop sign zone divided by the travel time of the vehicle while within the stop sign zone.

In a second alternative method of the invention, the vehicle may be classified into a failed or non-failed status using an improved calculation of the method described above. The main determination may be made as to whether at any time while traveling through the stop sign zone, the vehicle has slowed down to a predetermined slow speed threshold, for example 5 mph or below. Vehicles that did not slow down to that speed threshold, may be classified as failed.

Figure 10:
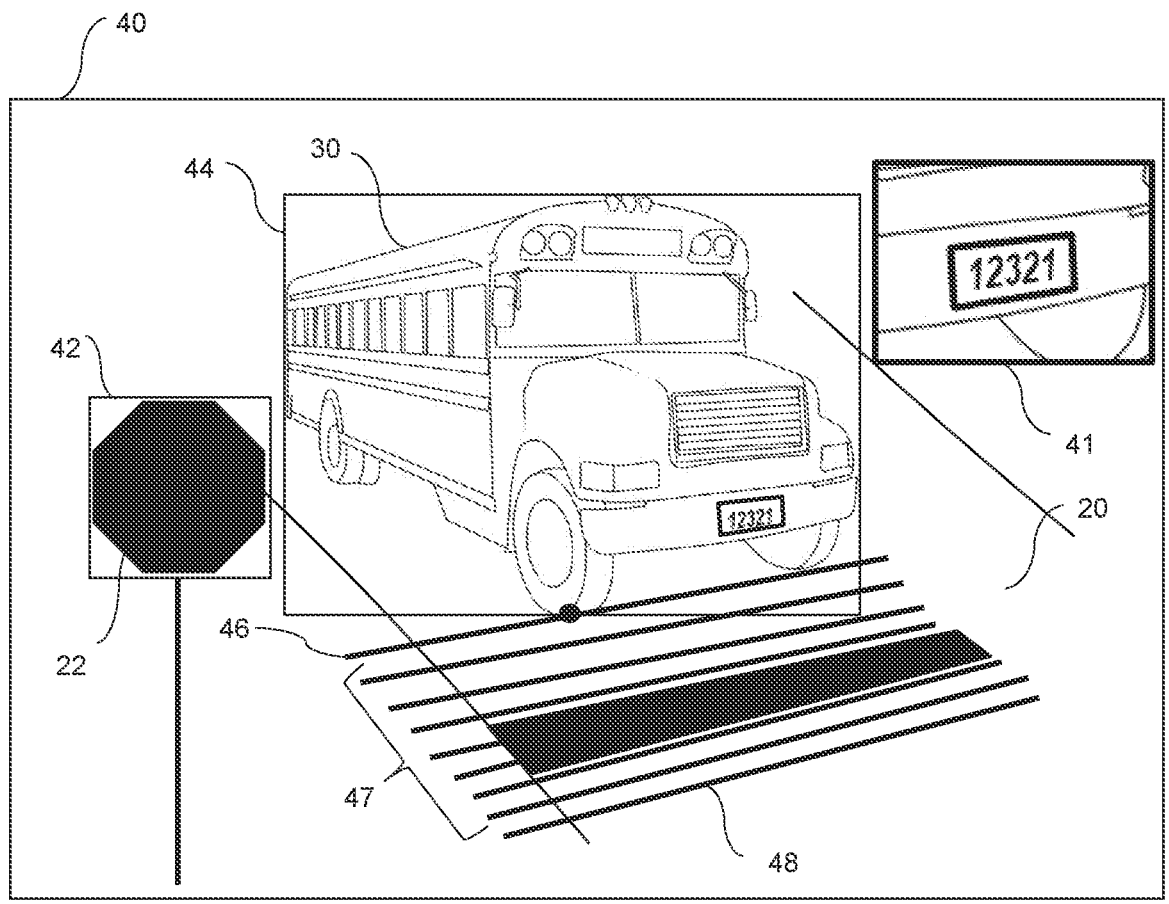
FIG. 10 shows an illustration of an alternative method of the invention.

To improve the accuracy of this determination, the stop sign zone which is bounded by the virtual start line 46 and the end line 48 as described above, may be further subdivided into a number of consecutive segments of equal length. This may be done by placing additional intermittent virtual lines 47, positioned at a constant length increment from each other, as illustrated in FIG. 10. In one example, the incremental length of each segment may be 1 ft. FIG. 10 shows an example with placing 7 intermittent lines dividing the entire stop sign zone into 8 consecutive segments.

Individual times for the vehicle to proceed through each of the selected segments may be calculated using the number of frames when the vehicle is located within each segment, as described above. Knowing the width of each segment allows calculating a number of speeds characterizing the vehicle traveling at different points throughout the stop sign zone. A plurality of individual speeds of the vehicle traveling through each segment may then be calculated. If at least one of these individual speeds is at of below the predetermined slow speed threshold, the vehicle may be characterized as non-failed. If all of the individual speeds are above the slow speed threshold, the vehicle may be characterized as failed.

This approach provides an advanced method for assessing vehicle speed behavior with a high level of granularity, enabling traffic monitoring systems to detect subtle speed changes as vehicles approach, pass, and leave stop lines. This approach is particularly useful for detailed traffic studies, enhancing safety protocols, and enforcing speed-related traffic laws more effectively.

It is contemplated that any embodiment discussed in this specification can be implemented with respect to any method of the invention, and vice versa. It will be also understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference. Incorporation by reference is limited such that no subject matter is incorporated that is contrary to the explicit disclosure herein, no claims included in the documents are incorporated by reference herein, and any definitions provided in the documents are not incorporated by reference herein unless expressly included herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12, 15, 20 or 25%.

All of the devices and/or methods disclosed and claimed herein can be made and executed without undue experimentation in light of the present disclosure. While the devices and methods of this invention have been described in terms of preferred embodiments, it will be apparent to those of skill in the art that variations may be applied to the devices and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A method for detecting and qualifying stop sign compliance by a moving vehicle, the method comprising the following steps:

a. providing a video camera located with a field of view of a road and an adjacent stop sign,
b. operating the video camera to record ongoing traffic with a predetermined rate of frames per second, with the stop sign included in the video recording,
c. transmitting the video recording to a computing device operatively connected to the video camera and configured to automatically analyze the video recording therefrom,
d. operating the computing device to automatically identify a start frame in which the vehicle is at or first crossed a start line indicating beginning of a stop sign zone on the road,
e. operating the computing device to automatically identify an end frame in which the vehicle is at or first crossed an end line indicating an end of the stop sign zone of the road,
f. calculating a number of frames starting with the start frame and ending with the end frame,
g. determining the elapsed time between the start frame and the end frame using the predetermined video recording rate of frames per second,
h. qualifying the vehicle compliance with the stop sign by a first criterion as follows:
  i. compliant with strict regulations, if the elapsed time of step (g) is at or exceeds a predetermined strict elapsed time threshold,
  ii. compliant with at least slow-down regulations, if the elapsed time of step (g) is at or exceeds a predetermined slow-down elapsed time threshold but is less than the strict elapsed time threshold, and
  iii. non-compliant with any regulations, if the elapsed time of step (g) is less than the slow-down elapsed time threshold,
i. for vehicles determined is step (h) to be compliant with strict regulations or slow-down regulations, further qualifying the vehicle by a second criterion of coming to a complete stop for at least a predetermined stop time threshold as follows:
  i. compliant with police-strict regulations and with strict regulations if the vehicle came to the complete stop for at least the predetermined stop time threshold and the vehicle is located within the stop sign zone before or at the actual stop sign or stop line on the road,
  ii. compliant with strict regulations but non-compliant with police-strict regulations if the vehicle came to the complete stop for at least the predetermined stop time threshold and the vehicle is located within the stop sign zone beyond the actual stop sign or stop line on the road,
  iii. non-compliant with either the police-strict regulations or the strict regulations if the vehicle did not come to the complete stop for at least the predetermined stop time threshold, and
j. generating a report with results of the analysis and qualification, wherein the position of the start line and the end line defining the stop sign zone can be adjusted using the computing device based on local conditions and preferences.

2. The method for detecting and qualifying stop sign compliance by a moving vehicle, as in claim 1, wherein in step (a) the camera is positioned to provide a field of view to include the road before and after the stop sign or the stop line.

3. The method for detecting and qualifying stop sign compliance by a moving vehicle, as in claim 1, wherein step (d) further comprises a step of defining a vehicle bounding box enclosing the vehicle and the step of identifying the start frame in which the vehicle is at or first crossed a start line indicating beginning of a stop sign zone on the road is accomplished using the vehicle bounding box.

4. The method for detecting and qualifying stop sign compliance by a moving vehicle, as in claim 1, wherein step (d) further comprises a step of defining a stop sign bounding box enclosing the stop sign and identifying a stop line if available.

5. The method for detecting and qualifying stop sign compliance by a moving vehicle, as in claim 1, wherein in step (d), the stop sign bounding box is defined based on an octagonal shape thereof.

6. The method for detecting and qualifying stop sign compliance by a moving vehicle, as in claim 5, wherein step (d) further comprises a step of defining a start line before the stop sign and a stop line after the stop sign to identify the stop sign zone on the video recording from the video camera.

7. The method for detecting and qualifying stop sign compliance by a moving vehicle, as in claim 6, wherein the step (d) further comprises a step of identifying a middle point of a lower border of the vehicle bounding box, wherein the step of identifying the start frame in which the vehicle is at or first crossed a start line is accomplished using the middle point of the lower border of the vehicle bounding box.

8. The method for detecting and qualifying stop sign compliance by a moving vehicle, as in claim 7, wherein the first frame of the video recording in which the middle point of the lower border of the vehicle bounding box is first detected as located on the start line or within the stop sign zone is designated as the start frame.

9. The method for detecting and qualifying stop sign compliance by a moving vehicle, as in claim 7, wherein in step (e) the first frame of the video recording in which the middle point of the lower border of the vehicle bounding box is first detected as located on the end line or beyond the stop sign zone is designated as the end frame.

10. The method for detecting and qualifying stop sign compliance by a moving vehicle, as in claim 1, further comprising a step of automatically identifying a license plate of the vehicle.

11. The method for detecting and qualifying stop sign compliance by a moving vehicle, as in claim 10, wherein the step of identifying a license plate of the vehicle is followed by a step of automatically identifying a vehicle registration data.

12. The method for detecting and qualifying stop sign compliance by a moving vehicle, as in claim 1, further comprising a step of identifying at least one physical distance using a recognized object of known size present in the field of view.

13. The method for detecting and qualifying stop sign compliance by a moving vehicle, as in claim 12, wherein the step of identifying at least one physical distance is performed with the recognized object being the stop sign in the field of view of the video recording.

14. The method for detecting and qualifying stop sign compliance by a moving vehicle, as in claim 13, wherein the step of identifying at least one physical distance is performed by determining a scale factor using the known size of the stop sign and the visible height thereof in the field of view.

15. The method for detecting and qualifying stop sign compliance by a moving vehicle, as in claim 12, wherein the step of identifying at least one physical distance is performed with the recognized object being a license plate of the vehicle in the field of view of the video recording.

16. The method for detecting and qualifying stop sign compliance by a moving vehicle, as in claim 15, wherein the step of identifying at least one physical distance is performed by determining a scale factor using a known height of the license plate of the vehicle and the visible height thereof in the field of view.

17. The method for detecting and qualifying stop sign compliance by a moving vehicle, as in claim 1, wherein step (j) further comprising a step of automatically transmitting the report to law enforcement for further review or action.

18. The method for detecting and qualifying stop sign compliance by a moving vehicle, as in claim 17, wherein step (j) further comprising a step of accompanying the report with a corresponding video recording or a pertinent photo recording.

19. A system for detecting and qualifying stop sign compliance by a moving vehicle, the system comprising:
   a video camera located to have a field of view of a road and an adjacent stop sign,
   a computing device operably connected to the video camera to receive a video recording therefrom, the computing device is further configured to:
   a. automatically identify a start frame in which the vehicle is at or first crossed a start line indicating beginning of a stop sign zone on the road, wherein the position of the start line is adjustable via user interface based on local conditions and preferences,
   b. automatically identify an end frame in which the vehicle is at or first crossed an end line indicating an end of the stop sign zone of the road, wherein the position of the end line is adjustable via user interface based on local conditions and preferences,
   c. calculate a number of frames starting with the start frame and ending with the end frame,
   d. determine the elapsed time between the start frame and the end frame using the predetermined video recording rate of frames per second,
   e. qualify the vehicle compliance with the stop sign by a first criterion as follows:
      i. compliant with strict regulations, if the elapsed time of step (g) is at or exceeds a predetermined strict elapsed time threshold,
      ii. compliant with at least slow-down regulations, if the elapsed time of step (g) is at or exceeds a predetermined slow-down elapsed time threshold but is less than the strict elapsed time threshold, and
      iii. non-compliant with any regulations, if the elapsed time of step (g) is less than the slow-down elapsed time threshold,
   f. for vehicles determined is step (h) to be compliant with strict regulations or slow-down regulations, further qualify the vehicle by a second criterion of coming to a complete stop for at least a predetermined stop time threshold as follows:
      i. compliant with police-strict regulations and with strict regulations if the vehicle came to the complete stop for at least the predetermined stop time threshold and the vehicle is located within the stop sign zone before or at the actual stop sign or stop line on the road,
      ii. compliant with strict regulations but non-compliant with police-strict regulations if the vehicle came to the complete stop for at least the predetermined stop time threshold and the vehicle is located within the stop sign zone beyond the actual stop sign or stop line on the road,
      iii. non-compliant with either the police-strict regulations or the strict regulations if the vehicle did not come to the complete stop for at least the predetermined stop time threshold, and
   g. generate a report with results of the analysis and qualification.

20. The system for detecting and qualifying stop sign compliance by a moving vehicle, as in claim 19, wherein the video camera is located remotely from the computing device.

* * * * *